United States Patent
Yanase et al.

(12)

(10) Patent No.: US 6,339,957 B1
(45) Date of Patent: *Jan. 22, 2002

(54) APPARATUS FOR IDENTIFYING TIRES AND METHOD THEREOF

(75) Inventors: Minao Yanase, Kobe; Yuji Oshiro, Kakogawa, both of (JP)

(73) Assignees: Sumitomo Rubber Industries, Ltd., Hyogo-Ken; Sumitomo Electric Industries, Ltd., Osaka-Fu, both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/349,237

(22) Filed: Jul. 8, 1999

(30) Foreign Application Priority Data

Jul. 9, 1998 (JP) .............................. 10-194141

(51) Int. Cl.$^7$ .............................................. E01C 23/00
(52) U.S. Cl. ......................................... 73/146; 340/442
(58) Field of Search ........................ 73/146 OR, 146.5, 73/146.2, 146.3, 146.8, 8, 9; 340/442, 445, 444, 443

(56) References Cited

U.S. PATENT DOCUMENTS 5,771,480 A * 6/1998 Yanase et al. ................ 701/80
6,137,400 A * 10/2000 Yanase et al. .............. 340/442

FOREIGN PATENT DOCUMENTS

JP         7149119         6/1995

* cited by examiner

*Primary Examiner*—Benjamin R. Fuller
*Assistant Examiner*—Abdullahi Aw-Musse

(57) ABSTRACT

An apparatus for identifying between summer tires and winter tires based on rotational information obtained from tires attached to a four-wheeled vehicle equipped with a limited slip differential device. The apparatus comprises a rotational information detecting means for detecting rotational information of each of the tires, a memory means for storing rotational information of each of the tires, an arithmetic processing means for respectively calculating reciprocals of turning radiuses based on rotational information of tires attached to a driving shaft as well as judged value based on rotational information of each of the tires, and an identification means for identifying whether the tires attached to the driving shaft are summer tires or winter tires from a relationship between reciprocals of turning radiuses and the judged value. It is possible to accurately perform detection of decrease in tire air-pressure since alarm is generated upon identification of the tires.

8 Claims, 10 Drawing Sheets

APPARATUS FOR IDENTIFYING TIRES AND METHOD THEREOF

BACKGROUND OF THE INVENTION

The present invention relates to an apparatus for identifying tires and a method thereof. More particularly, it relates to an apparatus for identifying tires wherein it is identified whether the tires are summer tires or winter tires for the purpose of improving performance and safety of a vehicle equipped with a limited slip differential device (LSD).

Since longitudinal grooves and vertical grooves are engraved in tires for drainage purposes, rubber blocks are formed surrounded by these grooves. A block of large size is hardly deformed through shear strength in vertical and lateral directions and presents high rigidity. Such a tire having a tread pattern which comprises such a large block is called a tire of large pattern rigidity.

Since cornering power, cornering force as well as slip rate are largely affected by the degree of the pattern rigidity, it is required to know the pattern rigidity of the tires in order to estimate behaviors of a vehicle based on rotational information of the tires in case the vehicle is equipped with a means for improving the performance and safety of the vehicle by utilizing rotational information of tires such as ABS (anti-lock braking system), TCS (traction control system) or NAVI (navigation system). Generally, the pattern rigidity of a summer tire is large and that of a winter tire small.

It is also conventionally known that a decrease in tire air-pressure results in a smaller dynamic load radius of the tires so that the rotational speed becomes faster than that of tires of normal air pressure. Japanese Unexamined Patent Publication No. 149119/1995 discloses one example of a method for detecting decrease in internal pressure based on relative differences in the number of revolutions of tires. Further, since the rotational speed of tires is affected by many factors such as turning movement, acceleration or deceleration, load or speed of the vehicle, it has been variously devised to eliminate influences of these.

However, among vehicles that are manufactured in these years, there are some that are equipped with a limited slip differential device at differential gears of driving shaft for the purpose of improving running performances at the time of cornering or the like. Due to the mechanism of such a limited slip differential device, differentiation is restricted until a differential torque exceeds a set value, and right and left driving wheels are rotated at equal speeds. Due to this arrangement, influences of decreases in air pressure are not reflected in the number of revolutions so that a decompressed condition cannot be detected based on relative comparison of the number of revolutions.

While tuning of an apparatus for alarming decrease in tire air pressure that is controlled based on rotational information of tires is performed as to be suitable to tires attached to a new car, it was conventionally the case that estimations of behaviors of the vehicle were largely different from initially tuned values in case the tires were changed from summer tires to winter tires or, vice versa, from winter tires to summer tires, since these largely differ from each other in their specifications. Consequently, there existed the danger that incorrect information could be transmitted to the driver.

The present invention has been made in view of these circumstances, and it is an object thereof to provide an apparatus for identifying tires and a method thereof with which is it possible to identify whether the tires are summer tires or winter tires in a vehicle equipped with a limited slip differential device.

SUMMARY OF THE INVENTION

In accordance with the present invention, there is provided an apparatus for identifying between summer tires and winter tires based on rotational information that can be obtained from tires attached to a four-wheeled vehicle equipped with a limited slip differential device, wherein the apparatus comprises a rotational information detecting means for detecting rotational information of each of the tires, a memory means for storing rotational information of each of the tires, an arithmetic processing means for respectively calculating reciprocals of turning radiuses based on rotational information of tires attached to a driving shaft from among rotational information of each of the tires as well as judged values based on rotational information of each of the tires, and an identification means for identifying whether the tires attached to the driving shaft are summer tires or winter tires from a relationship between reciprocals of turning radiuses and the judged values.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In accordance with the present invention, there is also provided a method for identifying between summer tires and winter tires based on rotational information that can be obtained from tires attached to a four-wheeled vehicle equipped with a limited slip differential device, wherein it is identified whether tires attached to the driving shaft are summer tires or winter tires from a relationship between reciprocals of turning radiuses as calculated from rotational information of tires attached to the driving shaft of the four-wheeled vehicle and judged values as calculated from rotational information of tires attached to the four-wheeled vehicle.

The present invention will become more fully understood from the detailed description given hereinbelow and the accompanying drawings which are given by way of illustration only, and thus are not limitative of the present invention, and wherein:

DETAILED DESCRIPTION

The apparatus for identifying tires and a method thereof according to the present invention will now be explained based on the accompanying drawings.

Figure 1:
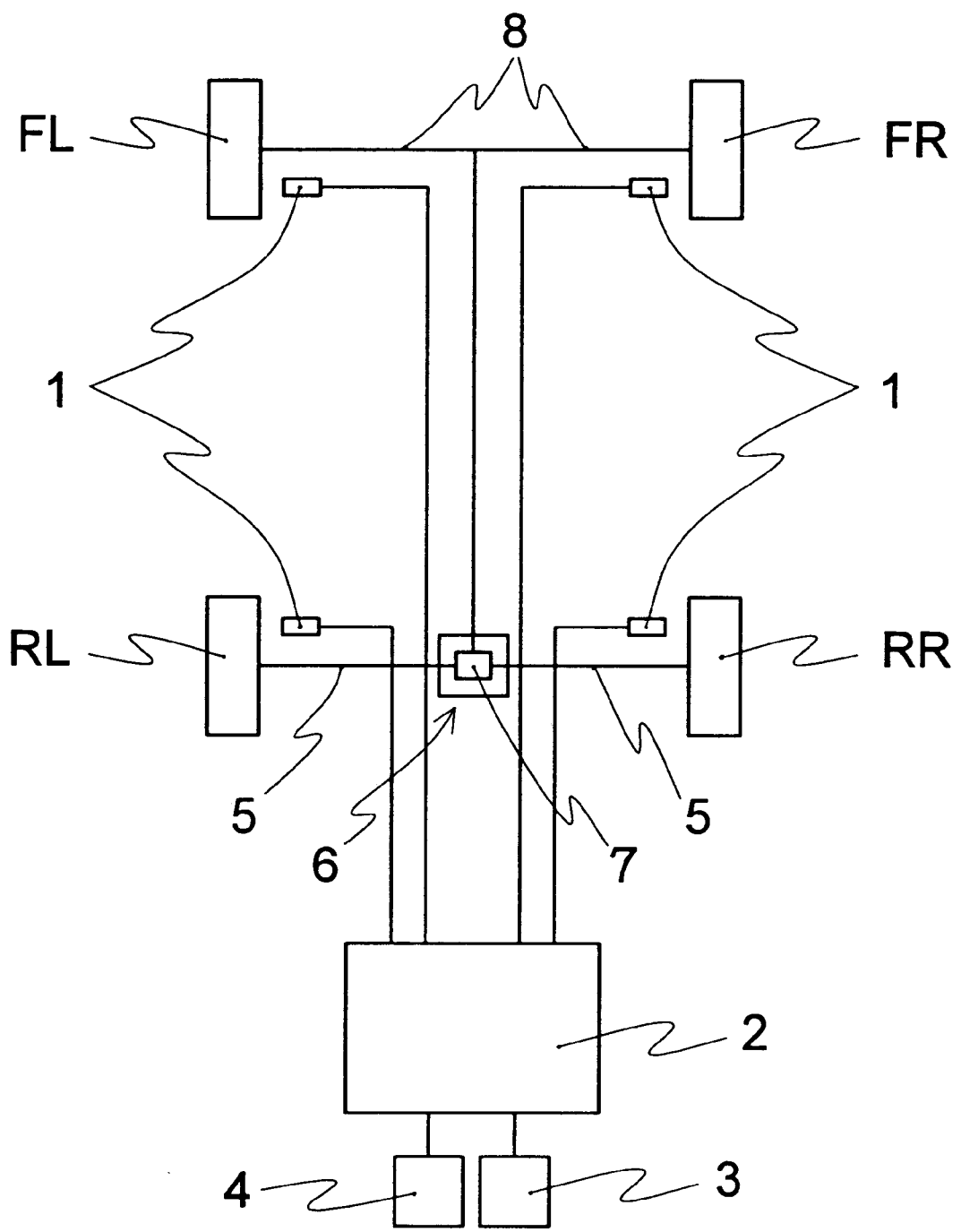
FIG. 1 is a block diagram showing an apparatus for alarming decrease in tire air-pressure related to the present invention.

By identifying whether tires attached to a four-wheeled vehicle equipped with a limited slip differential device are summer tires or winter tires, it is enabled to perform suitable judgements for either the summer tires or winter tires, to perform accurate judgements of internal pressure decrease of tires of the vehicle, and to be applicable to an apparatus for generating an alarm. An example of an apparatus for alarming decrease in tire air-pressure is shown in FIG. 1, wherein the apparatus detects whether the air-pressure of any of four tires FL, FR, RL or RR attached to a four-wheeled vehicle has decreased or not, and includes ordinary wheel speed sensors 1 that are provided in connection with each of the tires FL, FR, RL and RR. Each of the wheel speed sensors 1 performs detection of rotational information of the tires such as the number of revolutions, rotational speed or angular speed. Outputs of the wheel speed sensors 1 are supplied to a control unit 2. To this control unit 2, there are connected a display means 3 comprising liquid crystal display elements, plasma display elements or CRT which serve to notice either of the tires FL, FR, RL or RR of which air-pressure has decreased, and an initializing switch 4 can be operated by a driver. A limited slip differential device 7 is mounted on a differential gear 6 of a driving shaft 5. Note that 8 denotes a following shaft.

Figure 2:
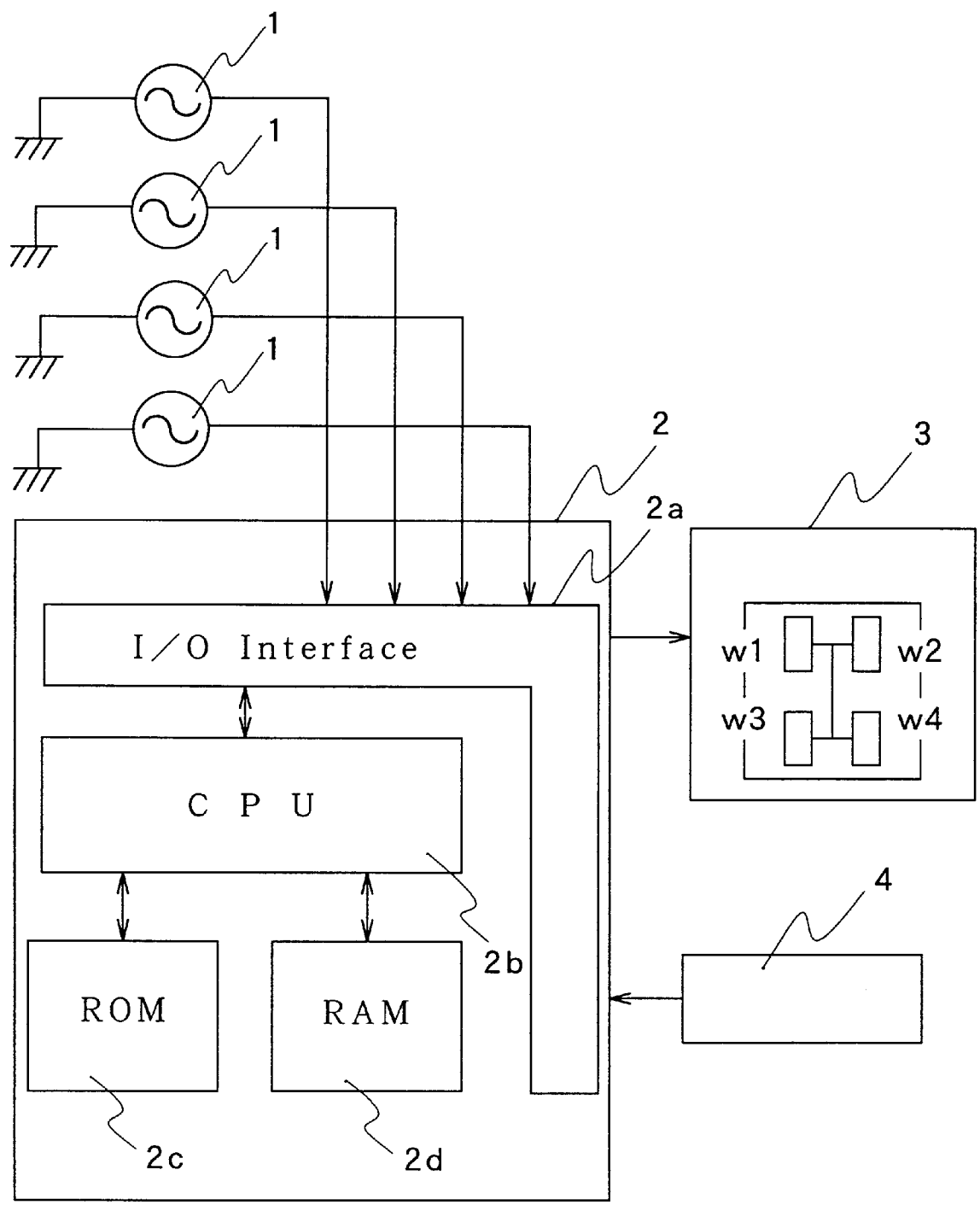
FIG. 2 is a block diagram showing electric arrangements of the apparatus for alarming decrease in tire air-pressure of FIG. 1.

As shown in FIG. 2, the control unit 2 is composed of an I/O interface 2a required for sending/receiving signals to and from an exterior device, a CPU 2b functioning as a center of arithmetic processing, a ROM 2c storing therein a control operation program for the CPU 2b, and a RAM 2d into which data are temporally written in or from which the written-in data are read in case the CPU 2b performs control operations. It should be noted that in this embodiment, each of the wheel speed sensors 1 corresponds to the rotational information detecting means and the control unit 2 to the memory means, arithmetic processing means and identifying means.

It will now be explained arithmetic processing and identification in the present invention for a case in which the judged value (DEL value) is set to be a difference between two diagonal sums of rotational information values.

Since right and left driving wheels (tires) are rotated at equal speed until a turning movement is performed in which a torque exceeding a predetermined differential limiting torque is generated, the DEL value obtained from the following equation (1) is only proportional to a difference in rotational speed between right and left following wheels.

$$DEL = \frac{\frac{V_{(1)}+V_{(4)}}{2} - \frac{V_{(2)}+V_{(3)}}{2}}{\frac{V_{(1)}+V_{(2)}+V_{(3)}+V_{(4)}}{4}} \times 100 \quad (1)$$

Here, $V_{(x)}$ denotes rotational speed of tire (m/sec), and x: 1=front left tire, 2=front right tire, 3=rear left tire and 4=rear right tire, respectively.

Figure 3:
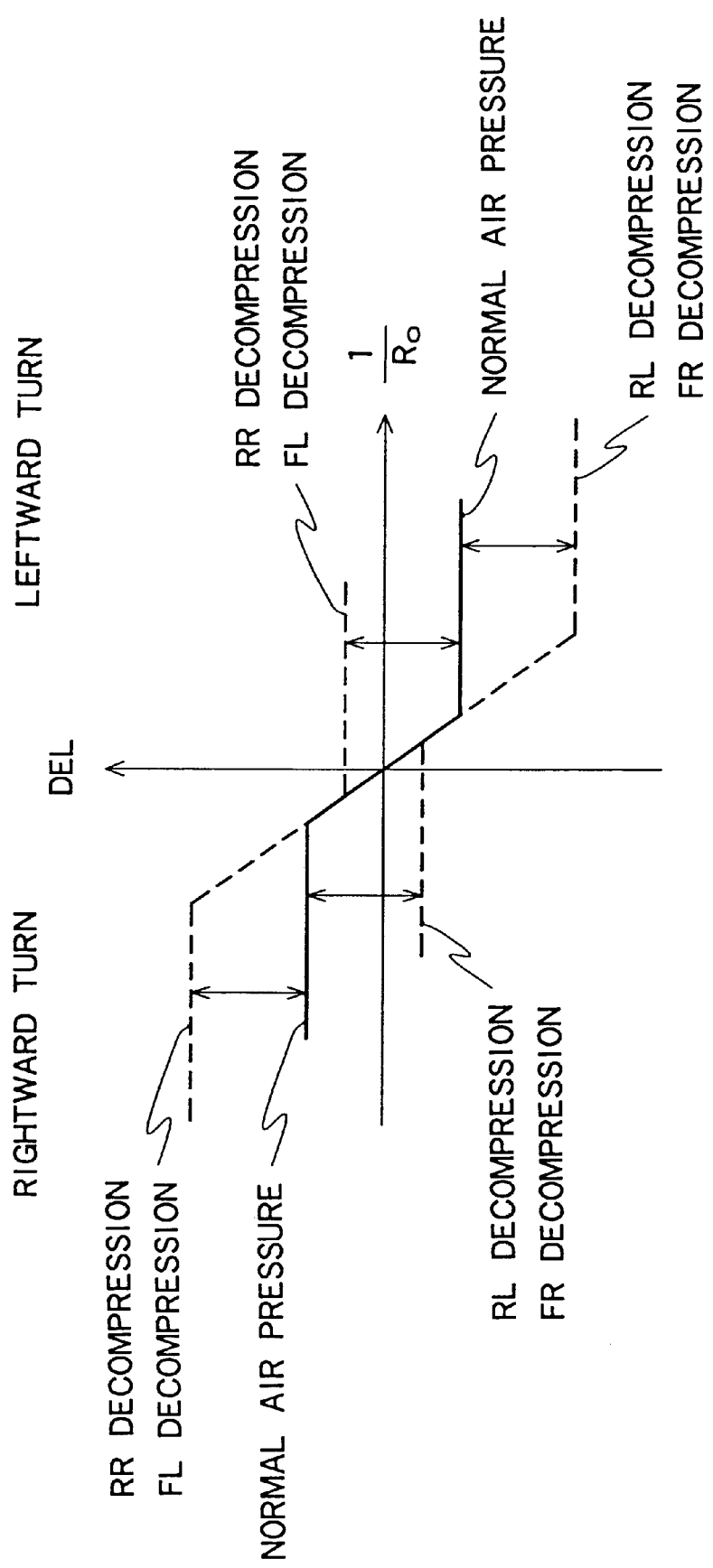
FIG. 3 is a schematic diagram showing the relationship between reciprocals of turning radiuses and judged values as calculated from differences between right and left following wheels.
Figure 4:
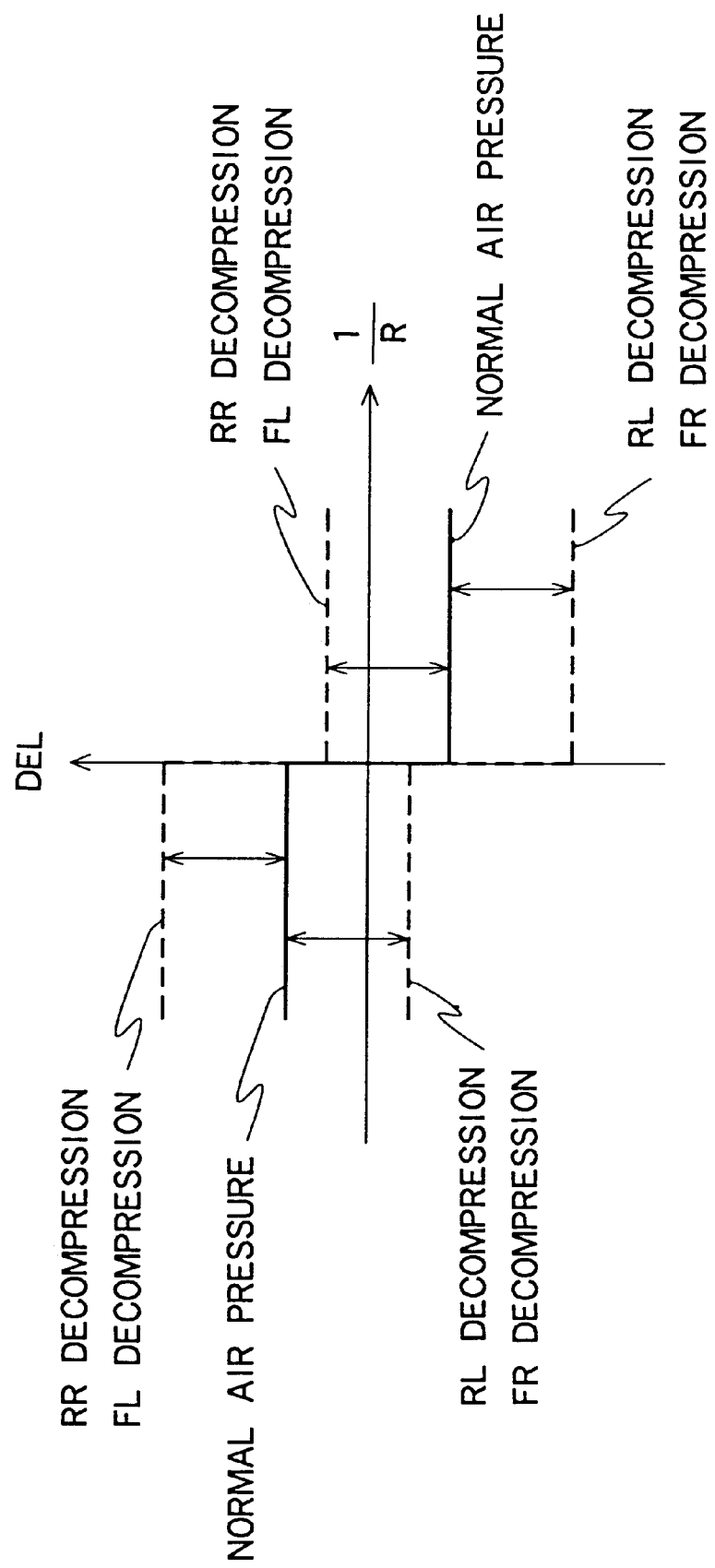
FIG. 4 is a schematic diagram showing the relationship between reciprocals of turning radiuses and judged values as calculated from differences between right and left driving wheels.

Unless the vehicle is driving on a special road surface, the differential torque is dependent on the turning radius. Thus, in case a reciprocal $1/R_0$ of a turning radius $R_0$ is calculated based on the difference in rotational speed between right and left following wheels from the following equation (2) and the DEL value is set to be a judged value for decompression, the DEL value will just correspond to the difference between the right and left following wheels when the differential is restricted as shown in FIG. 3, and when exceeding a set differential torque, the DEL value will become substantially constant.

$$\frac{1}{R_0} = \frac{1}{T_W} \times \frac{V_{(1)} - V_{(2)}}{V_{AVE}} \quad (2)$$

Here, $T_W$ denotes a tread width, and $V_{AVE}$ an average value between right and left tires.

In such a relationship between the reciprocals of the turning radiuses of the following wheels $1/R_0$ and the DEL values, a decompression in the driving wheels will result in a shift of a central turning radius of right and left driving wheels of which differential is limited, and a decompression in the following wheels will result in a shift of the whole calculation of the turning radius itself. Consequently, parallel displacement of the DEL values in a vertical direction will occur along a line of the difference between right and left following wheels (diagonal line). Therefore, determination of decompression needs to be performed by comparing respective horizontal portions in a condition of an ordinary air-pressure and in a decompressed condition. For this purpose, it will be required to identify where the horizontal portion actually starts in both of these conditions. However, it is quite difficult to specify such horizontal portions (areas) since these horizontal portions vary according to variations in characteristics of tires such as differences in their material, size or rigidity as well as to the amount of decompression of the tire.

By taking the reciprocals of the turning radiuses of the following wheels $1/R_0$ as calculated by using the driving shaft on the lateral axis (X axis), DEL values are made to be focused on spots where the lateral axis is 0, that is, on the longitudinal axis (Y axis), regardless of the presence or absence of decompression or the position thereof in case where the differential is limited. Therefore, by performing comparison of judged values at horizontal portions that are somewhat remote therefrom, decompression can be easily determined.

While it has been explained that the DEL values become horizontal in case the turning radiuses exceeded a certain value and the limited slip differential device has started operations, it will still be varied depending on the speed or the driving force of the vehicle or lateral acceleration (lateral G) so that it is required to perform correction also at this point. For example, variations in DEL values owing to load movement or driving force at the time of performing turning movements or sensitivity correction of DEL values owing to speed can be adjusted by performing correction which are based on preliminary investigations, through performing tuning of vehicles, of their influences, whereby variations in the DEL values can be limited to improve the accuracy of the vehicle.

In case of performing tuning of a vehicle, respective factors of summer tires and winter tires such as cornering correction coefficients or speed sensitivity correction coefficient are preliminarily obtained at the time of initialization driving, and average values thereof are set as average factors. For instance, cornering correction is performed to perform correction as to obtain judged values regardless of the degree of lateral G, since the judged values are varied accompanying the increase in the lateral G owing to factors such as load movement or slip during cornering as shown by ◇ marks (actually measured values) in FIG. 5 and FIG. 6.

Figure 5:
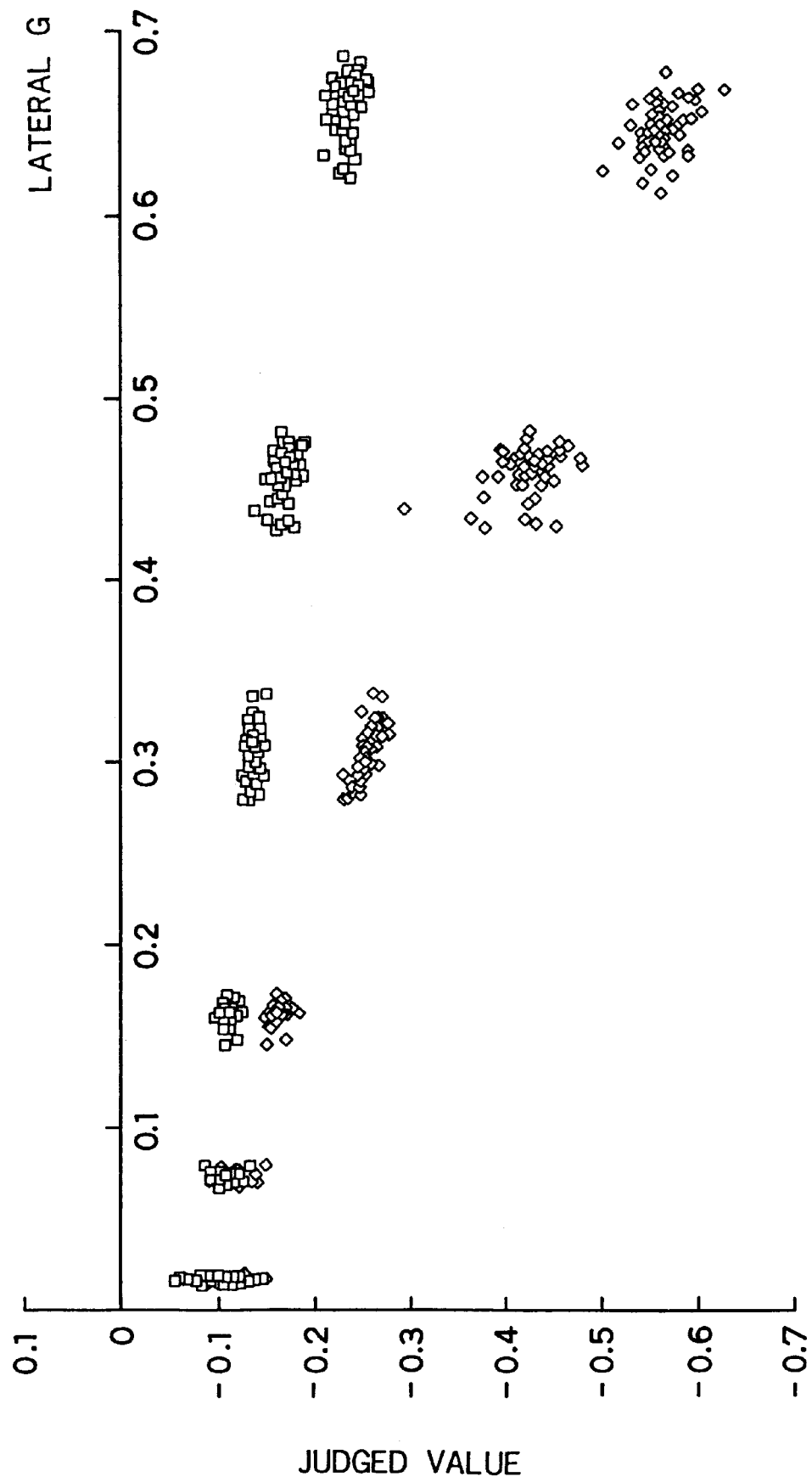
FIG. 5 is a diagram showing the relationship between lateral G values and judged values in case of summer tires and employing average factors.
Figure 6:
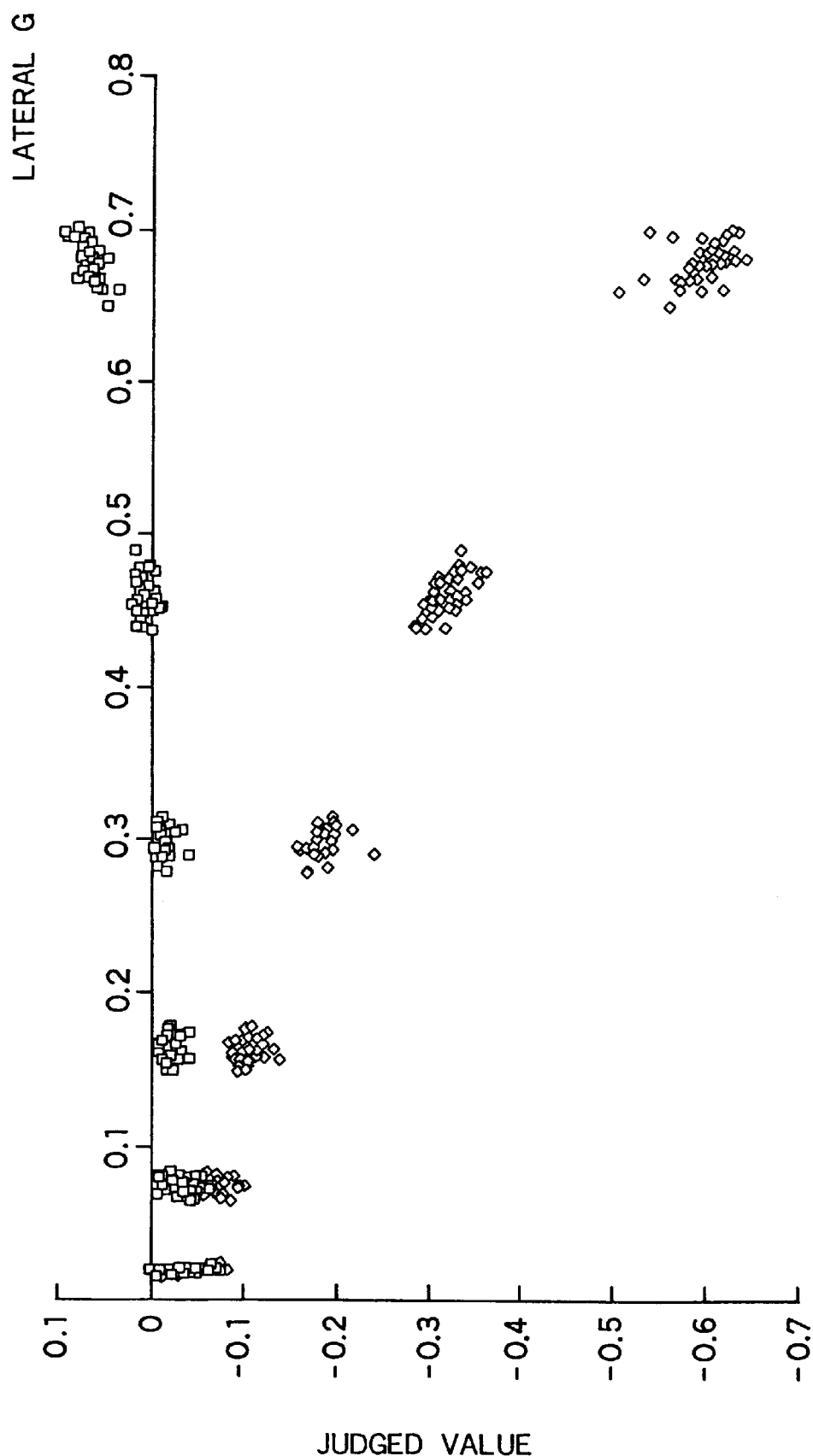
FIG. 6 is a diagram showing the relationship between lateral G values and judged values in case of winter tires and employing average factors.

In case of employing average factors when performing cornering correction, correction cannot be sufficiently performed in case of winter tires as shown by □ marks in FIG. 5, and excessive correction is performed in case of summer tires as shown by □ marks in FIG. 6, so that no accurate correction can be performed. Thus, constraints (thresholds) of reject for the lateral G need to be set to be strict (for instance, the threshold of reject for the lateral G needs to be set to 0.2 in the case of FIGS. 5 and 6) so that the amount of data available for the determination of generating alarm will be decreased. Consequently, in case of performing initialization by using average factors (correction coefficients) of summer tires and winter tires, a large amount of data will be required at the time of actual driving following the initialization, and there is a fear that it will take longer to determine generation of alarm.

Figure 7:
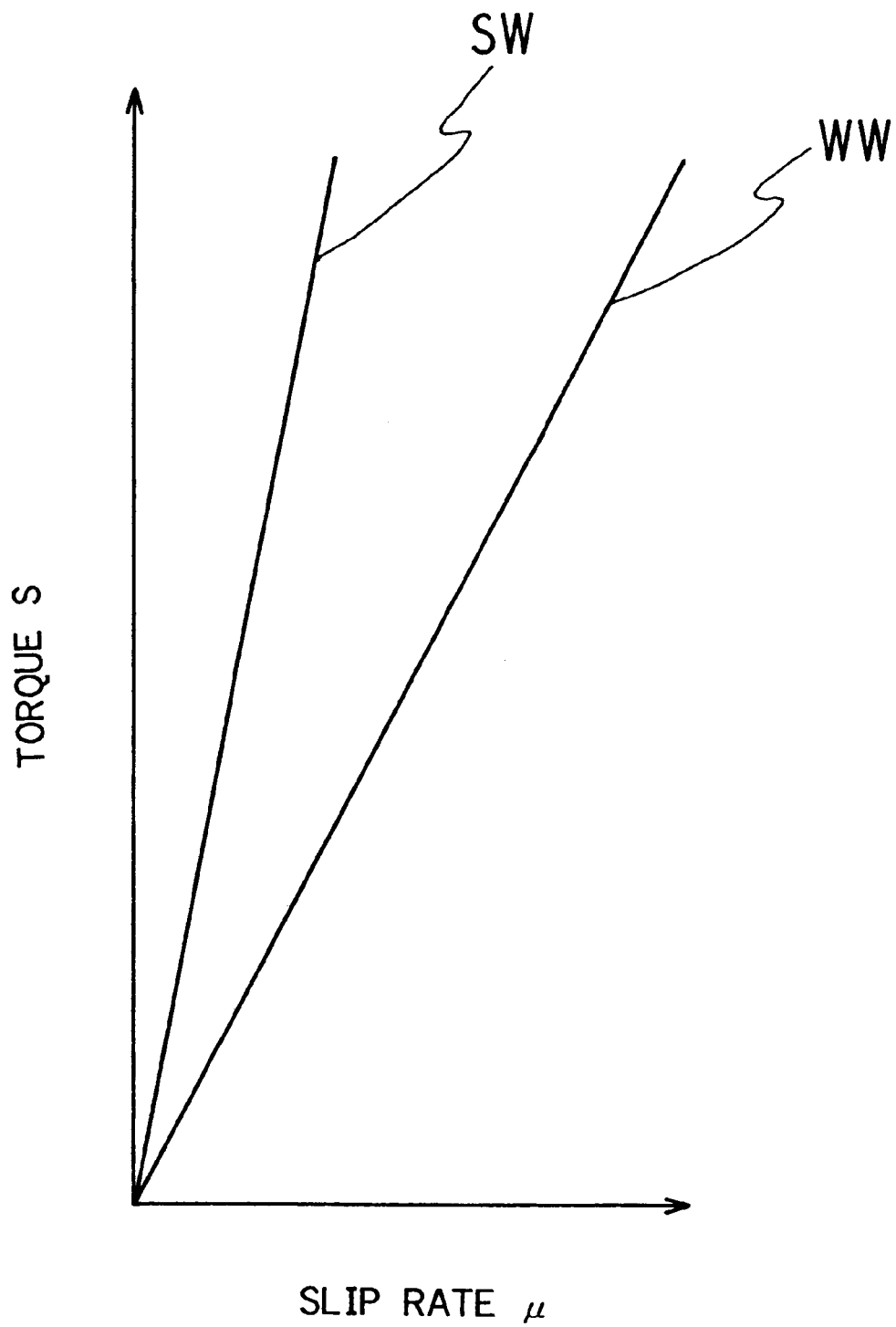
FIG. 7 is a diagram showing the $\mu$-s characteristics of summer tires and those of winter tires.

Therefore, it will be identified in the present invention whether the tires are summer tires or winter tires. Winter tires are those of which tread patterns or materials have been changed in order to enable driving on snowy road surfaces and are marked at sidewall portions thereof with indications such as "SNOW" "M+S", "STUDLESS", "ALL WEATHER" or "ALL SEASON". Summer tires are not marked with such indications at sidewall portions thereof unlike winter tires. As shown in the schematic view of FIG. 7, the slope of $\mu$-s characteristics (torque-slip rate characteristics) of summer tires differs from that of winter tires. This indicates that the slip rate of a winter tire WW is greater than that of a summer tire with respect to the same amount of torque. In other words, it indicates that slip is apt to occur with a winter tire so that torque is hardly transmitted from the road surface.

Figure 8:
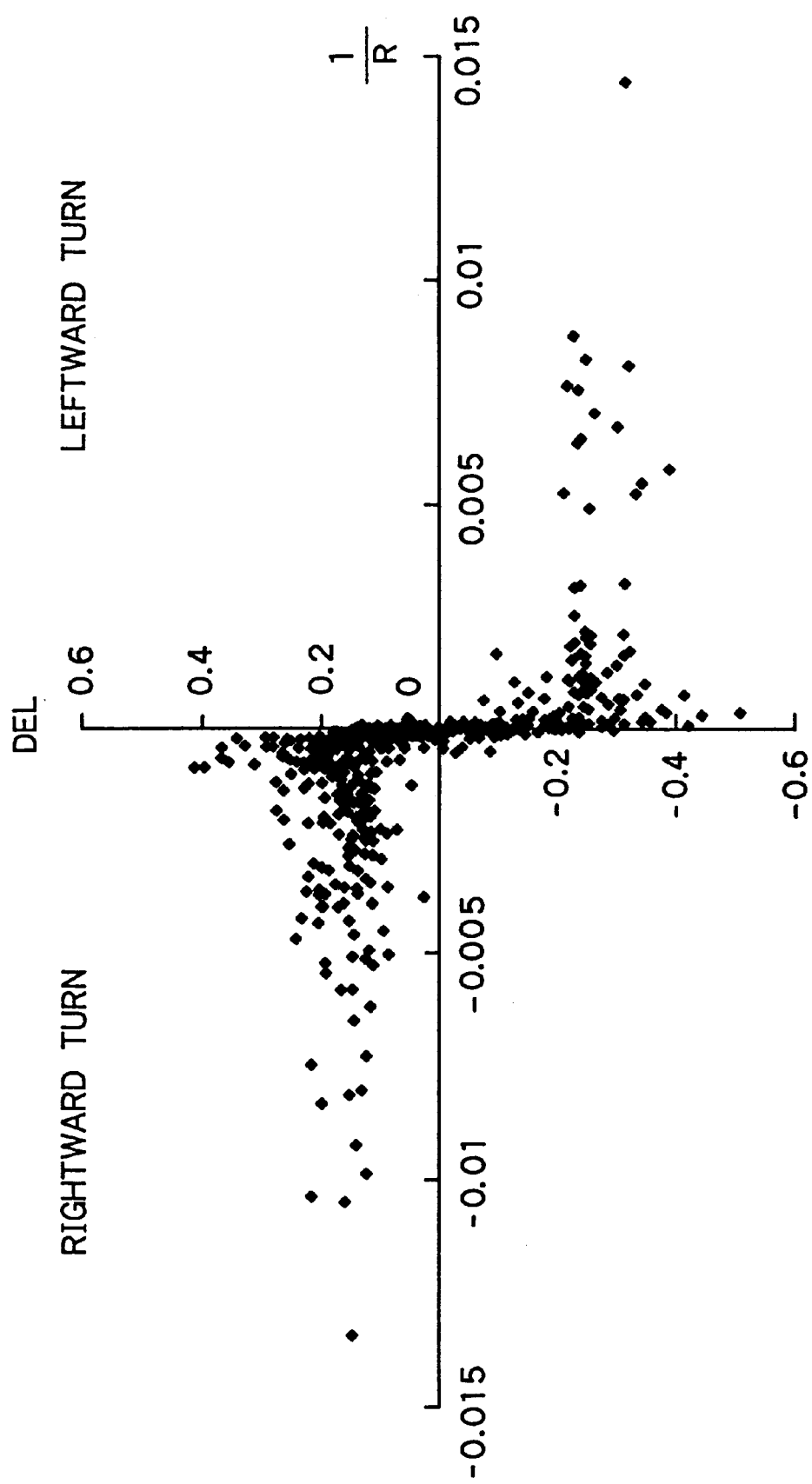
FIG. 8 is a diagram showing the relationship between reciprocals of turning radiuses of driving wheels and judged values in the case of winter tires.

In a vehicle equipped with a LSD, the judged values will assume a hook-like shape as shown in FIG. 8 with respect to reciprocals of turning radiuses as obtained from driving wheels in the case of, for instance, winter tires. In case a vehicle equipped with a LSD makes a turning movement, right and left driving wheels are made to run at identical speed until a specified torque difference is generated so that the handling differences in following wheels just become the judged values in the proximity of the straight line (in a vehicle which is not equipped with LSD, the driving wheels will not be fixed so that the judged values obtained from difference between two diagonal sums of rotational information values of wheels will become 0). In case a specified torque difference is exceeded by the turning movement, the vehicle performs the turning while maintaining the differential difference, thereby the shape is assumed.

Figure 9:
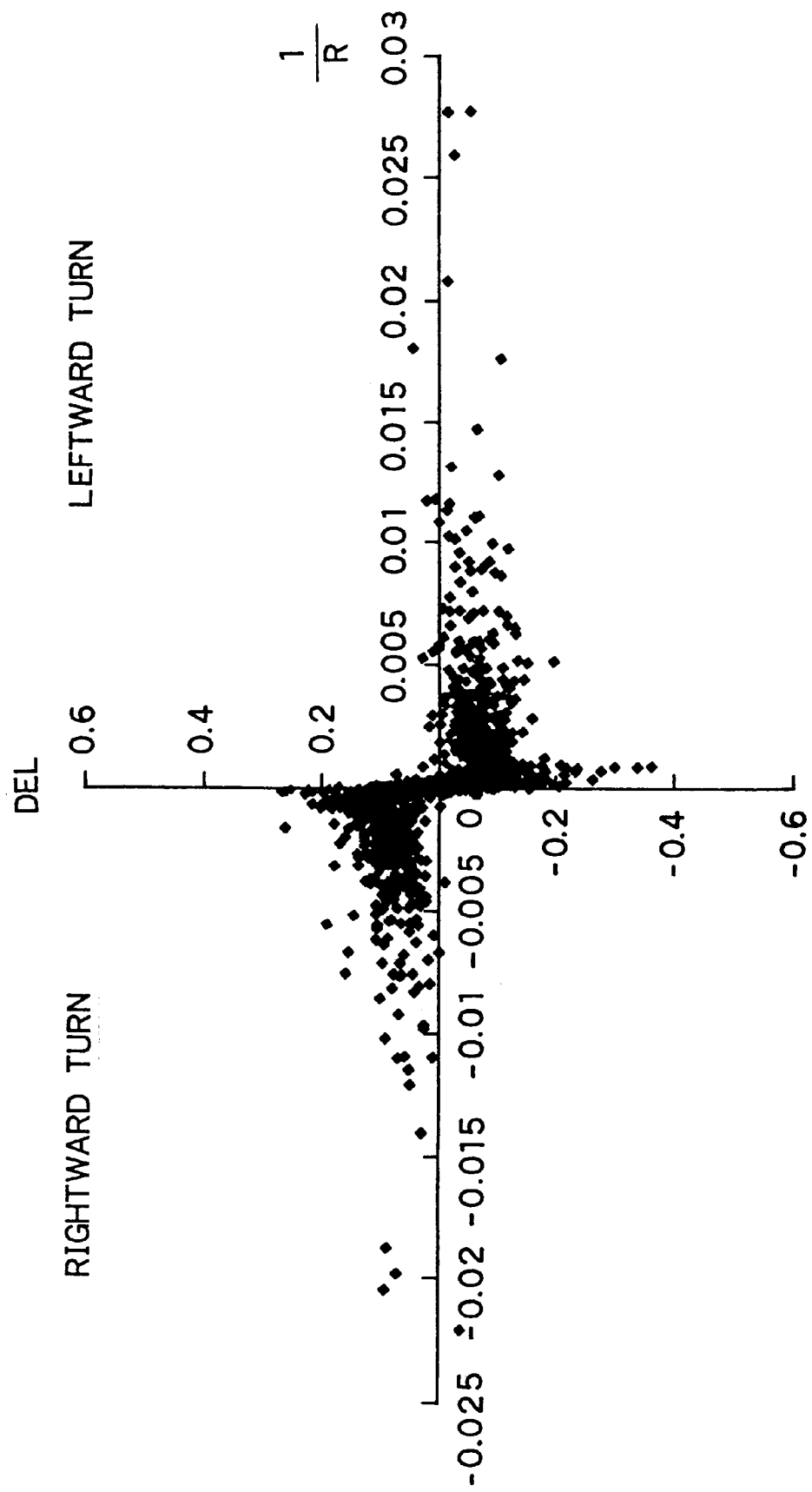
FIG. 9 is a diagram showing the relationship between reciprocals of turning radiuses of driving wheels and judged values in the case of summer tires.

As is evident from the above two points, differentials are released owing to torque differences generated also in case of a large turning radius since torque can be more easily transmitted from the road surface in case of summer tires of large rigidity. On the other hand, in case of winter tires of small rigidity, they are apt to slip so that torque is hardly transmitted, whereby differential is hard to be released so that no differential difference is generated unless the turning radius is made smaller than that of summer tires. Therefore, the judged values (DEL values) in the proximity of the straight line in case of winter tires shown in FIG. 8 become larger than the judged values (DEL values) in the proximity of the straight line in case of winter tires shown in FIG. 9. It can also be noted that the judged values in case the vehicle is making a left turn are different from those in case the same is making a right turn.

Figure 10:
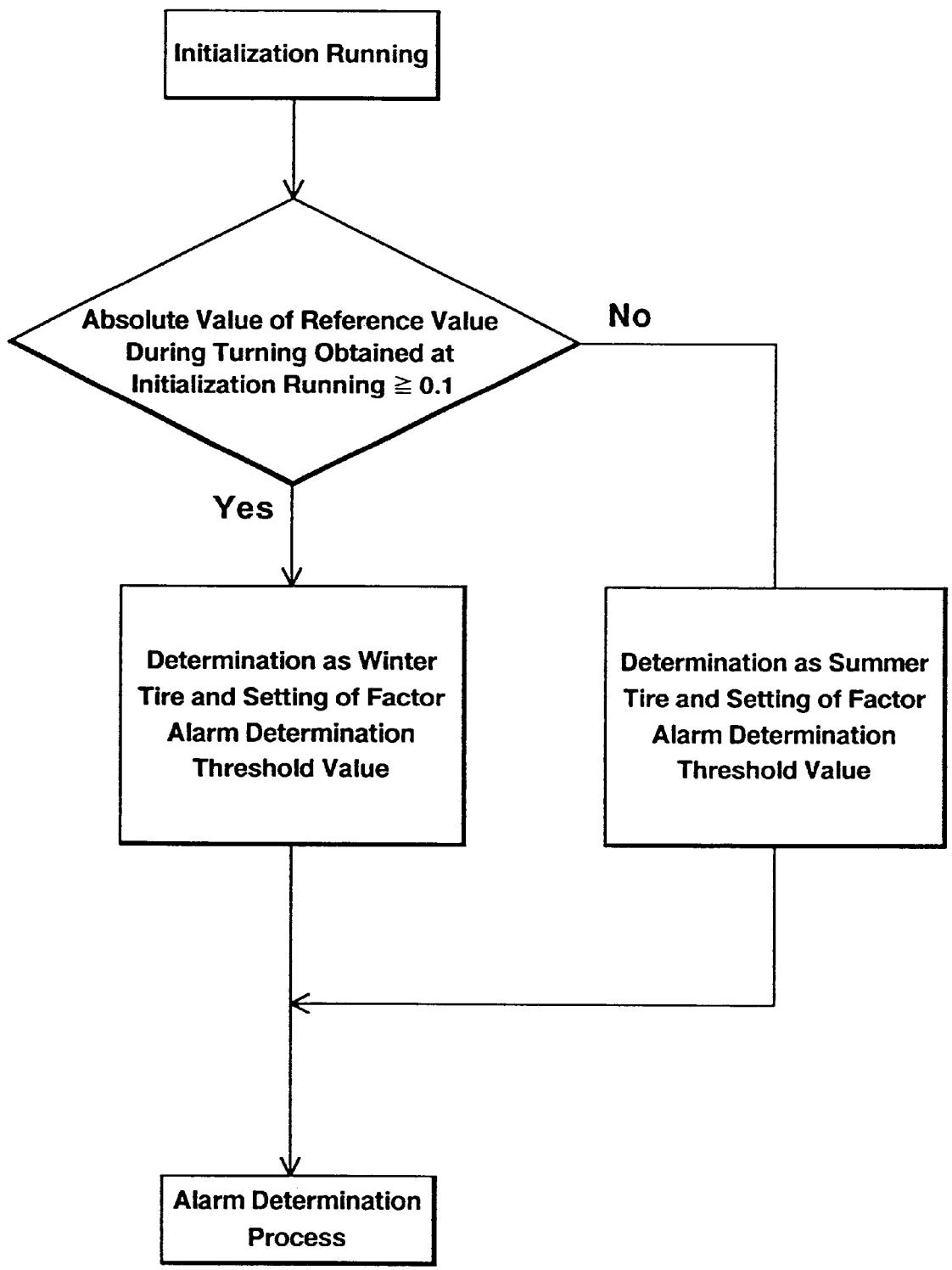
FIG. 10 is a flowchart showing an example for using the apparatus for identifying a tire.

It can thus be understood that it is possible to distinguish summer tires from winter tires based on magnitude of judged values. In an apparatus for alarming decrease in air-pressure provided in a vehicle equipped with a LSD, average values for judged values during straight-ahead driving, during a left turn and during a right turn are obtained at the time of performing initialization driving under normal internal pressure to set these as reference values, and determination of decompression is performed based on the amount of shift therefrom. In the present embodiment, in case of winter tires, the reference value for the left turn is set to be −0.2197, the reference value for the right turn to be 0.1237, and in case of summer tires, the reference value for the left turn is set to be −0.0463 and the reference value for the right turn to be 0.0605. Thus, for identifying tires, as shown in FIG. 10, in case the absolute values of reference values at the time of performing right and left turn are not less than 0.1, it can be determined that the tires are winter tires, and otherwise, that the tires are summer tires.

In this manner, since it is possible to identify whether the tires attached to a driving shaft are summer tires or winter tires based on the relationship between reciprocals of turning radiuses and judged values, it is possible to generate alarm by accurately determining a decrease in internal pressure of a tire for each of the regions of the turning radiuses.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

As explained so far, according to the present invention, it is possible to identify whether the tires attached to a driving shaft are summer tires or winter tires based on the relationship between reciprocals of turning radiuses and judged values in a four-wheeled vehicle equipped with a limited slip differential device. In this manner, it is possible to accurately perform detection of decrease in tire air-pressure since alarm is generated upon identification of the tires.

What is claimed is:

1. An apparatus for identifying between summer tires and winter tires based on rotational information that is obtained from tires attached to a driving shaft of a four-wheeled vehicle equipped with a limited slip differential device, wherein the apparatus comprises:

a rotational information detecting means for detecting rotational information of each of the tires attached to said driving shaft;

a memory means for storing the rotational information of each of the tires;

an arithmetic processing means for calculating a reciprocal of a turning radius based on the rotational information and for calculating judged values based on the rotational information of each of the tires; and an identification means for identifying whether the tires attached to the driving shaft are summer tires or winter tires from a relationship between the reciprocal of the turning radius and the judged values.

2. A method for identifying between summer tires and winter tires based on rotational information obtained from tires attached to a four-wheeled vehicle equipped with a limited slip differential device, said method comprising the steps of:

calculating a reciprocal of a turning radius based on rotational information of each of the tires and calculating judged values based on the rotational information; and identifying whether the tires are summer tires or winter tires from a relationship between the reciprocals of the turning radius and the judged values.

3. The apparatus according to claim 1, wherein the reciprocal of the turning radius (1/Ro) is calculated from the following equation:

$$\frac{1}{Ro} = \frac{1}{T_W} \times \frac{V_{(3)} - V_{(4)}}{V_{AVE}}$$

wherein $T_W$ is the tread width, $V_{(3)}$ and $V_{(4)}$ are the velocity of the left and right tires attached to a driving shaft, respectively and $V_{AVE}$ is an average velocity between right and left tires.

4. The apparatus according to claim 1, wherein the judged value (DEL) is calculated from the following equation:

$$DEL = \frac{\frac{V_{(1)} + V_{(4)}}{2} - \frac{V_{(2)} + V_{(3)}}{2}}{\frac{V_{(1)} + V_{(2)} + V_{(3)} + V_{(4)}}{4}} \times 100$$

wherein $V_{(1)}$, $V_{(2)}$, $V_{(3)}$ and $V_{(4)}$ are the velocity of the front left tire, front right tire, rear left tire and rear right tire, respectively.

5. The apparatus according to claim 3, wherein the judged value (DEL) is calculated from the following equation:

$$DEL = \frac{\frac{V_{(1)} + V_{(4)}}{2} - \frac{V_{(2)} + V_{(3)}}{2}}{\frac{V_{(1)} + V_{(2)} + V_{(3)} + V_{(4)}}{4}} \times 100$$

wherein $V_{(1)}$, $V_{(2)}$, $V_{(3)}$ and $V_{(4)}$ are the velocity of the front left tire, front right tire, rear left tire and rear right tire, respectively.

6. The method according to claim 2, further comprising the step of calculating said reciprocal of the turning radius (1/Ro) from the following equation:

$$\frac{1}{Ro} = \frac{1}{T_W} \times \frac{V_{(3)} - V_{(4)}}{V_{AVE}}$$

wherein $T_W$ is the tread width, $V_{(3)}$ and $V_{(4)}$ are the velocity of the left and right tires attached to a driving shaft, respectively and $V_{AVE}$ is an average velocity between right and left tires.

7. The method according to claim 2, further comprising the step of calculating the judged value (DEL) from the following equation:

$$DEL = \frac{\frac{V_{(1)} + V_{(4)}}{2} - \frac{V_{(2)} + V_{(3)}}{2}}{\frac{V_{(1)} + V_{(2)} + V_{(3)} + V_{(4)}}{4}} \times 100$$

wherein $V_{(1)}$, $V_{(2)}$, $V_{(3)}$ and $V_{(4)}$ are the velocity of the front left tire, front right tire, rear left tire and rear right tire, respectively.

8. The method according to claim 6, further comprising the step of calculating the judged value (DEL) from the following equation:

$$DEL = \frac{\frac{V_{(1)} + V_{(4)}}{2} - \frac{V_{(2)} + V_{(3)}}{2}}{\frac{V_{(1)} + V_{(2)} + V_{(3)} + V_{(4)}}{4}} \times 100$$

wherein $V_{(1)}$, $V_{(2)}$, $V_{(3)}$ and $V_{(4)}$ are the velocity of the front left tire, front right tire, rear left tire and rear right tire, respectively.

* * * * *